United States Patent
Cragun

(10) Patent No.: US 7,602,892 B2
(45) Date of Patent: Oct. 13, 2009

(54) TELEPHONY ANNOTATION SERVICES

(75) Inventor: Brian J. Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 10/941,414

(22) Filed: Sep. 15, 2004

(65) Prior Publication Data

US 2006/0056599 A1 Mar. 16, 2006

(51) Int. Cl.
H04M 3/42 (2006.01)
(52) U.S. Cl. .................. 379/201.01; 379/77; 379/88.14; 379/88.18; 379/88.24; 455/412.1; 455/414.1; 700/94; 715/727; 715/728
(58) Field of Classification Search .................. 379/76, 379/77, 88.14, 88.18, 88.24, 201.01; 455/412.1, 455/414.1; 700/94; 715/727, 728
See application file for complete search history.

(56) References Cited

U.S. PATENT DOCUMENTS

| | | | | |
|---|---|---|---|---|
| 5,222,125 A | * | 6/1993 | Creswell et al. ........ | 379/114.05 |
| 5,241,586 A | * | 8/1993 | Wilson et al. ............ | 379/88.11 |
| 5,555,299 A | * | 9/1996 | Maloney et al. ........ | 379/212.01 |
| 5,732,216 A | * | 3/1998 | Logan et al. ................ | 709/203 |
| 5,751,792 A | * | 5/1998 | Chau et al. ............... | 379/88.17 |
| 5,923,746 A | * | 7/1999 | Baker et al. ............ | 379/265.02 |
| 5,943,402 A | * | 8/1999 | Hamel et al. ............. | 379/88.26 |
| 6,041,114 A | * | 3/2000 | Chestnut ................ | 379/211.02 |
| 6,047,060 A | * | 4/2000 | Fedorov et al. ........ | 379/265.02 |
| 6,222,909 B1 | * | 4/2001 | Qua et al. ................ | 379/88.22 |
| 6,298,129 B1 | * | 10/2001 | Culver et al. ........... | 379/202.01 |
| 6,330,079 B1 | * | 12/2001 | Dugan et al. ................ | 358/403 |
| 6,650,738 B1 | * | 11/2003 | Pershan et al. ........... | 379/88.03 |
| 6,789,109 B2 | * | 9/2004 | Samra et al. ................ | 709/220 |
| 2001/0041590 A1 | * | 11/2001 | Silberfenig et al. ......... | 455/556 |
| 2002/0110226 A1 | * | 8/2002 | Kovales et al. ........... | 379/88.17 |
| 2003/0202504 A1 | * | 10/2003 | Dhara et al. ................ | 370/352 |
| 2004/0132432 A1 | * | 7/2004 | Moores et al. .............. | 455/413 |
| 2005/0037739 A1 | * | 2/2005 | Zhong ........................ | 455/413 |

* cited by examiner

*Primary Examiner*—Fan Tsang
*Assistant Examiner*—Hemant Patel
(74) *Attorney, Agent, or Firm*—Patterson & Sheridan, LLP

(57) ABSTRACT

A method and apparatus for providing a telephonic annotation services is disclosed. In one embodiment, a mobile telephone may be configured to include an annotation component used to record audio-based annotations for a telephone conversation. In another embodiment, a voice over internet protocol (VoIP) enabled telephone is used. Annotation recordings may be created both during and after a telephone conversation. The annotation recordings may be stored in a database and indexed to a telephone number associated with the other participant in the conversation. Subsequently, prior to calling the same telephone number, or prior to placing a call to the same telephone number, annotations may be selectively played back, according to criteria specified in an annotation profile. Additionally, annotations templates may be used to structure an annotation recording according to a predefined format. In one embodiment, annotation recordings created using an annotation template engage an individual in a dialog using synthesized speech to prompt a user for voice input that is recorded by the annotation component.

9 Claims, 7 Drawing Sheets

PROFILE

PLAY CRITICAL PLAYBACK BEFORE CONNECTING

LIMIT CRITICAL PLAY ON INCOMING TO

○ SECONDS [30]
○ ANNOTATIONS [3]

ORDER CRITICAL PLAY BACK BY

○ MOST RECENT
○ MOST IMPORTANT

RECORD ANNOTATIONS AFTERWARD

○ NEVER
○ ALWAYS
○ FOR THESE NUMBERS
  ☒ SAME AS CRITICAL PLAY

☐ USE ANNOTATION TEMPLATE

TELEPHONY ANNOTATION SERVICES

BACKGROUND OF THE INVENTION

1. Field of the Invention

The present invention generally relates to data management, and more particularly, to a method and system for applying annotation techniques to telephonic communications.

2. Description of the Related Art

Tacit knowledge is knowledge that is not made explicit because it may be highly personal, is oftentimes very transient, and usually requires joint, shared activities to be transmitted. Examples of tacit knowledge include subjective insights, intuitions, facts learned from conversational exchanges, and hunches. Because tacit knowledge is not typically captured in a systematic manner, it is often lost.

In many commercial settings, however, tacit knowledge exchanged between two individuals during a telephone conversation may be extremely valuable. For example, a salesperson may use tacit knowledge to help close sales with a client by having access to information about the client. Another example involves call management techniques used in modern call centers. Customers may contact a business regarding the products and services offered by the business. Because a customer will rarely be able to contact a particular individual at a call center more than once, tacit knowledge between telephone calls is lost for one side of the conversation. That is, the individual customer has the tacit knowledge gained from prior contact with the business, but different customer service representatives (CSRs) fielding the telephone calls do not. This can lead to poor customer service when customers are treated differently by different CSRs.

One approach for more permanently capturing tacit knowledge is to create annotations that capture information about a telephone conversation. While the basic unit of information exchange—a telephone conversation—has not changed, the technology we use to place telephone calls, however, has evolved (and is evolving) rapidly. Current telephone systems record the date, time, phone number, and length of a call. Some systems can also record the audio (i.e., the conversation) from the call. Without listening to an entire recording, however, the tacit knowledge remains largely inaccessible.

Further, some current call center systems provide written summaries or descriptions of a prior telephone call to a CSR agent fielding a subsequent. Such text based systems, however, fail to capture the tone, timbre, and timing that are inherent in interactive telephone conversation. That is, although these types of records may capture some of the substance of the prior conversation, they fail to capture much of the tacit knowledge available. Moreover, telephone conversations are an inherently audio-based communications method, therefore, any system to transform such communications to another form, e.g., written, will necessarily lose some information content due to the translation.

Accordingly, it would be useful for a telecommunication system to allow conversation participants to create audio-based annotation recordings that annotate portions of a telephone conversation.

SUMMARY OF THE INVENTION

Embodiments of the present invention allow conversations to be recorded and points within the conversation to be annotated with recorded statements and with text input using a keypad that may be integrated into currently used infrastructures. In one embodiment, this capability may be provided to mobile phone subscribers who desire to purchase the service from a mobile phone services provider. In another embodiment, a subscriber may contact an annotation system from any telephone and use the annotation service to initiate telephone calls that may be recorded and annotated. In another embodiment, CSR agents fielding calls at a call center may be presented with annotations made for a particular customer prior to engaging in a conversation with the customer.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and are therefore do not limit the scope thereof, for the invention may admit to other equally effective embodiments.

DETAILED DESCRIPTION OF THE PREFERRED EMBODIMENTS

Figure 1A:
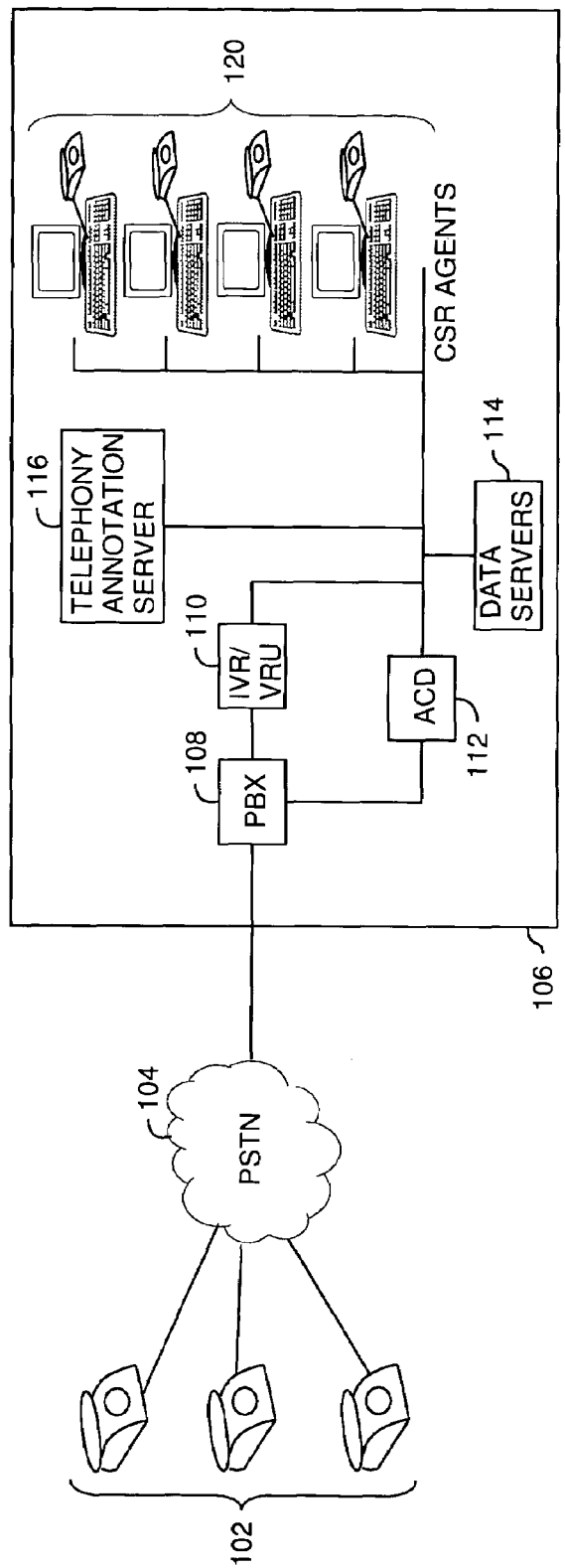
FIGS. 1A-1D illustrate functional views of telecommunication networks in which embodiments of the present invention may be implemented.

The present invention provides methods, systems, and articles of manufacture used to annotate a telephone conversation (referred to herein as a "conversation"). In one embodiment, prior to initiating a telephone call, a user may listen to annotations associated with the telephone number, or identity, of the individual to be called. From the other direction, another embodiment allows a person to review annotations created for prior telephone calls placed from a particular telephone number prior to answering a telephone call. In another embodiment, an individual participating in a conversation may chose to dynamically annotate an active conversation, as it occurs, or to place marker points in a recording of the conversation and create a corresponding annotation recording after completing the conversation. Further, annotation templates may be defined to allow annotation recordings to be created in a systematic manner.

One embodiment of the invention is implemented as a program product for use with a computer system such as, for example, the telecommunication architectures illustrated in FIG. 1 and described below. The programs of the program product define functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are typically comprised of variables and data structures that either reside locally to the program or are found in memory or on storage devices. Modern telephony devices, such as a mobile phone or voice over internet protocol (VoIP) enabled telephone may contain a processor and memory, and accordingly, embodiments of the present invention may be implemented to run on the telephone device directly. Alternatively, software components may be configured to communicate with a telephony annotation server maintained by a telecommunications service provider, e.g., the business providing a subscriber with mobile phone service may choose to provide annotation services to its subscribers for an additional fee.

In addition, various programs described below may be identified based upon the application for which they are implemented in a specific embodiment of the invention. However, it should be appreciated that any particular program nomenclature that follows is used merely for convenience, and thus, the invention should not be limited to use solely in any specific application identified or implied by such nomenclature.

As used herein, the terms "annotation" and "annotation recording" refers to any audio-recording, text string, other data, or combination thereof that is meant to refer to a portion of a conversation, whether the conversation itself is recorded or not. Also, as used herein, the term "mobile phone" refers to any cellular radio based telephone configured to operate in a cellular network such as CDMA, GSM, or other standardized communication protocols.

FIGS. 1A-1D show general examples of telecommunication environments. Note, however, that these examples illustrate a general environment in which embodiments of the invention may be implemented. Moreover, emerging technologies, such as VoIP, continue to reshape the modern telecommunications landscape. Accordingly, the environments depicted by FIG. 1 are meant to be illustrative of telecommunication environments that provide a framework for embodiments of the present invention, and should not, therefore, be considered in any way to limit the invention to the illustrated environments.

FIG. 1A depicts components of a call center 106. Generally, a call center 106 is used to place and receive telephone calls for the purposes of telemarketing, sales, customer support, or other business related activity. The call center 106 may support anywhere from a small number to many hundreds of customer service representatives (CSRs) 120 who handle calls to relay business information. Generally, an individual places a call to a phone number associated with a business entity that is handled by call center 106. The call is routed through the PSTN network 104 to the call center 106. PSTN is an acronym for Public Switched Telephone Network. Generally, the PSTN 104 comprises the world's public circuit-switched telephone networks, in much the same way that the Internet is the collection of the world's public IP-based packet-switched networks. Originally a network of fixed-line analog telephone systems, the PSTN 104 is now an almost entirely digital system that routes calls from mobile as well as fixed telephones.

At the receiving end of the call center 106, a PBX 108 receives the call placed to the call center 106. "PBX" (or private branch exchange) refers to a privately-owned telephone switch, used to provide inside telephone connectivity for the call center 106 and an access point to the PSTN 104. The PBX 108 may determine automatic number identification (ANI) associated with an incoming call and route the call to an interactive voice response (IVR) system 110 or to an automatic call distributor (ACD) 112. The Data servers 114 may store information related to customers of the business entity associated with call center 106. The data servers 114 may be accessed to provide a CSR with information related to a customer's account.

Additionally, telephony annotation server 116 (also referred to herein as an annotation component) may identify whether there are any stored annotations related to the customer calling the call center 106 (or for a particular telephone number used to place an outbound call) and provide them to the CSR prior to connecting the call. For example, callers may be identified using ANI data or may be identified from data collected using an interactive voice response system 110 such as a customer account number, personal identification number (PIN), and the like. After being identified, a CSR 120 selected by the ACD 112 to field the call may listen to annotations made to prior calls (and the portions of the annotated call) prior to being connected (or attempting to create a connection) with the caller.

Prior to connecting the call, while a CSR may be listening to any prior annotation recordings associated with the telephone number, the individual placing the call to the call center may be presented with audio messages describing services provided by the call center 106, or may also be presented with audio messages information the user that a conversation may be recorded. Certain states require such a disclosure be made prior to a conversation being recorded.

After previewing any annotations made for the caller, the call is connected with a particular CSR 120. During the call, the CSR 120 may cause the annotation component 116 to record portions of the call marked for later annotation at the discretion of the CSR. Alternatively, or in addition, calls may be annotated using a predefined annotation template selected for the call. Illustratively, the template selected may depend on the type of call (e.g., new customer, returning customer) the product involved, or any other appropriate factors.

Figure 1B:
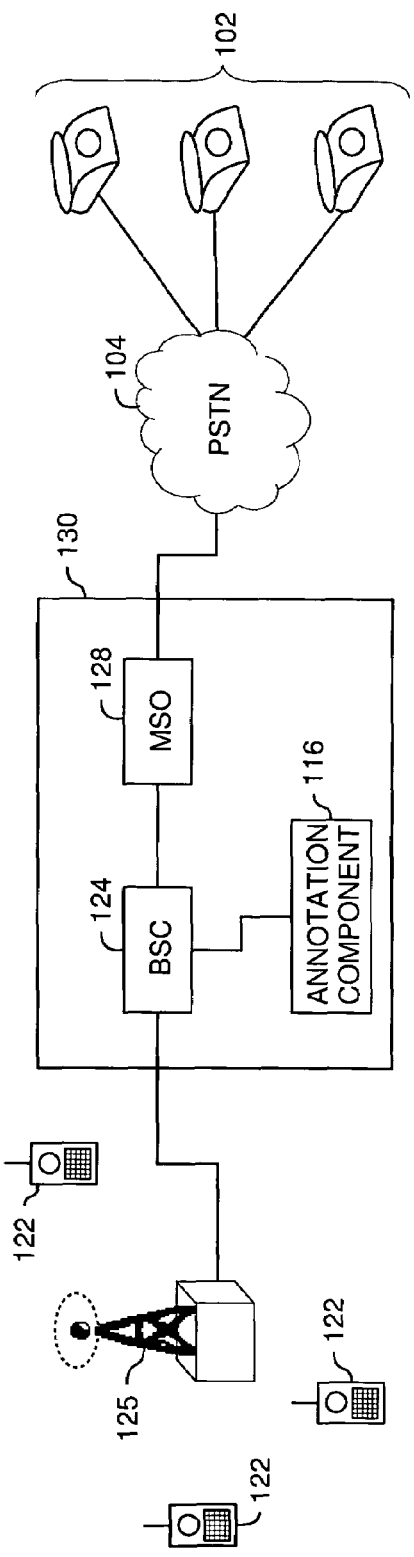

FIG. 1B illustrates a typical telecommunications architecture connecting a mobile telephone to the PSTN 104. Mobile phones 122 communicate with a plurality of base transceiver stations (BTS) 125 that act as a transmitting and receiving link. That is, the BTS 125 is the device that actually communicates with the mobile phone 122 using radio waves (e.g., current GSM-based mobile phones use the 900 MHz and 1800 MHz frequency bands). The BTS 125 connects to a base station controller BSC 124 over a high bandwidth communication line (e.g., a T1/E1 line). The BSC 124 and BTS 125 form the link between wireless devices and the "wireline" telephone network. Behind this connection, a mobile telephone switching office (MSO) 128 connects the BSC to the PTSN 104, and ultimately, other communication endpoints 102. The endpoints 102 may be any entity with a phone number capable of being dialed from mobile phone 122. Within this general framework, embodiments of the present invention allow a mobile service provider supplying the mobile telephone architecture (e.g., the BTS 125, BSC 124, and MSO 128) to provide audio-based telephonic annotations services. In one embodiment, a telephony annotation server 116 is integrated with the service provider's telecommunication components and may be configured to record telephone conversations and to store audio-based annotations related to a particular phone number or individual. In another embodiment, the mobile device 122 may contain the program products to create, store and manage telephonic annotations.

Figure 1C:
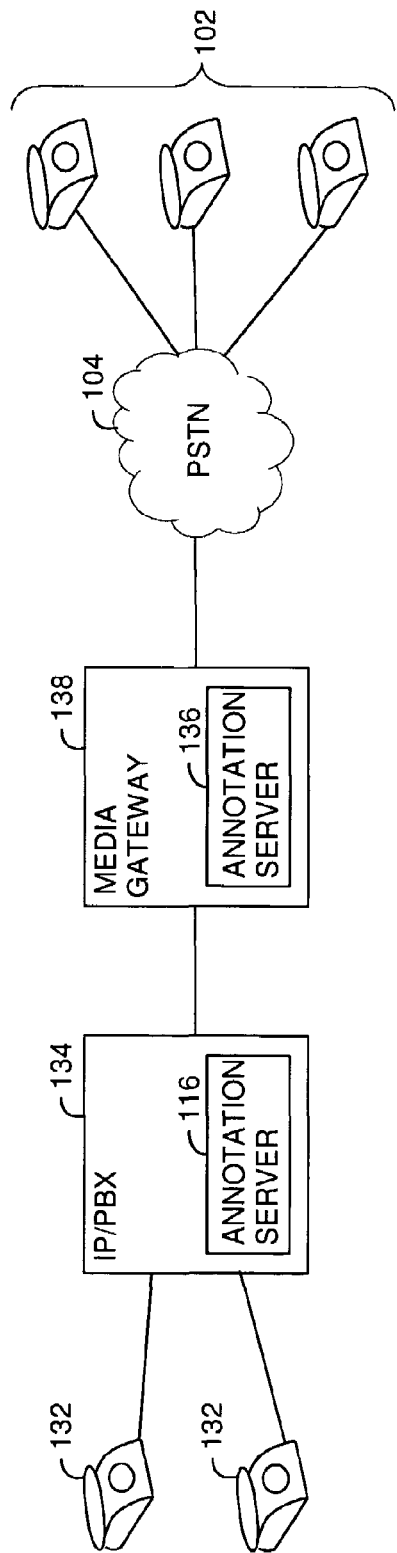

FIG. 1C illustrates an embodiment of a voice over internet protocol (VoIP) network telephone network connected to the PSTN. VoIP systems use packet switching networks, like the internet, to exchange the audio portion of a telephone conversation just as any other data transferred across the network (e.g., email, WebPages, and the like). A VoIP enabled telephone 132 is used to place and receive telephone calls in the same manner as a conventional telephone. In one embodiment, the VoIP telephone 132 is connected to an IP (internet protocol) based PBX 134. The IP/PBX 134 may be configured to include a telephony annotation server 116 that records conversations and annotations made for a conversation. Media gateway 138 is used to interconvert the VoIP packet switched data (e.g., IP datagram packets) with the PSTN network (e.g., SS7 data) 104. The media gateway 138 may also contain components of the annotation server 116.

Figure 1D:
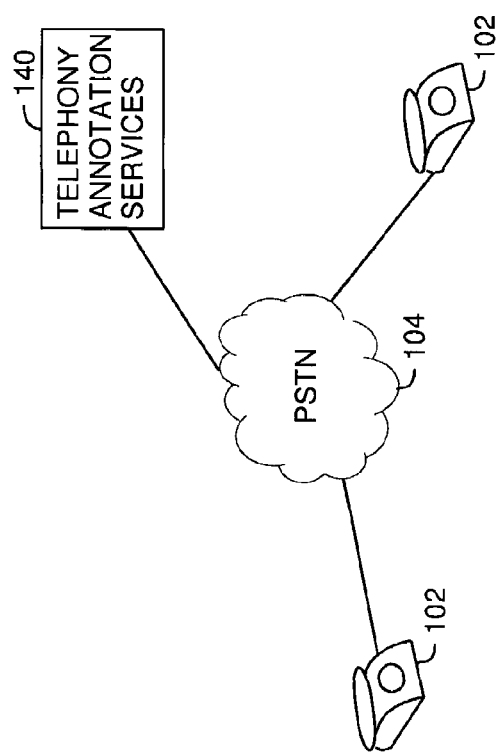

FIG. 1D illustrates two communication endpoints 102 connected to the PSTN 104. Also connected to the PSTN is an annotation service 140. In one embodiment, a subscriber contacts a telephony annotation service 140 using, for example, a "1-800" telephone number. Once connected to the annotation service 140, a caller may use the service initiate a telephone call to another number and receive, create, hear, and manage annotations created for a particular number. For example, prior to placing a telephone call to a particular number, the annotation service 140 might replay all the annotations made for a particular number within the last 10 days. Another example is a voicemail service that provides annotations to the messages left by a caller. When the subscriber retrieves any voicemail messages, the annotation service 140 could determine any relevant annotations based on ANI information corresponding to the telephone number used to place the voicemail message. Whether (and which) annotations are replayed may depend on rules defined abstractly in a user profile. For example, annotations could be played to a person retrieving messages from the service along with the actual voicemail message.

Again, note that FIGS. 1A through 1D illustrate general components of telecommunications networks. Also note that FIGS. 1A through 1D each includes the PSTN 104. Thus, any communication endpoint (e.g., standard telephones 102, mobile phones 122, VoIP enabled phones 132, and the like) connected to the PSTN may contact another communications endpoints. More generally, although illustrated separately the various networks illustrated in FIGS. 1A through 1D may be interconnected with each other though the PSTN. For example, an individual using a mobile telephone 122 (from FIG. 1B) may call a telephone number that connects to a VoIP enabled telephone 132 (from FIG. 1C). In such a case, embodiments of the present invention allow the caller using the mobile phone to hear annotations about the number being called, and the receiving entity to hear annotations made about the caller using the mobile phone 125 prior to initiating a conversation between the two endpoints. And new annotations may be created for the conversation as it occurs or after it has been completed.

Figure 2:
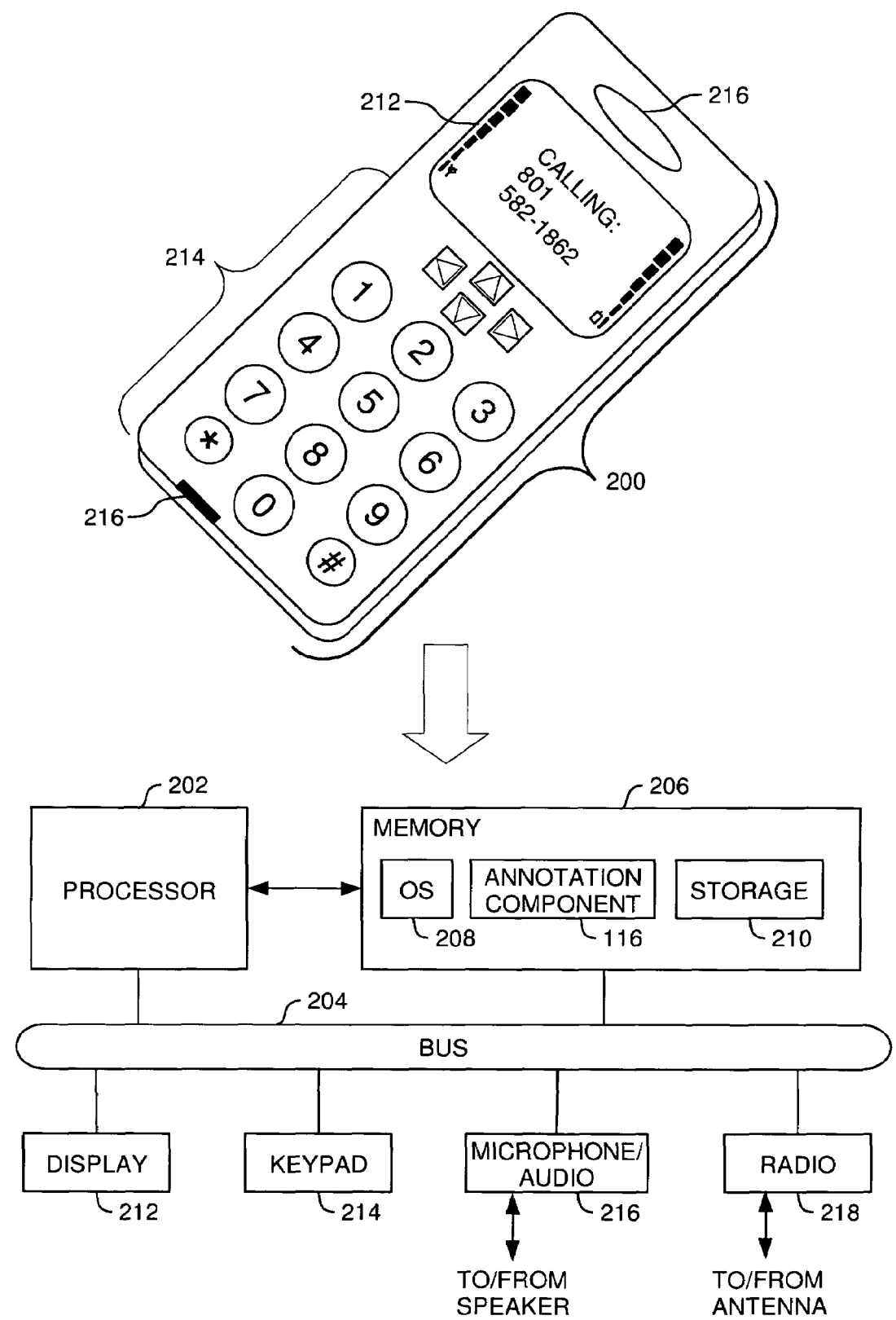
FIG. 2 illustrates a view of components of a mobile telephone.

FIG. 2 further illustrates a mobile telephone device 122 (from FIG. 1B) configured according to one embodiment of the present invention. A processor 202 is connected to a bus 204 and a memory 206. The memory 206 stores an operating system 208, and storage space 210 that may be configured to store annotation recordings, address books, and other data and applications. Annotation component 116 provides annotation services to the individual using the mobile phone 122. Also connected to the bus 204, is a display panel 212 used to display information. A keypad 214 is used to enter phone numbers, navigate through menus displayed on the display panel, and to select annotation functions. The mobile phone 122 also includes microphone and audio components 216 connected to a speaker and radio components to transmit and receive radio signals from the BTS 125.

In one embodiment of the invention, when an individual using a mobile telephone (like the one illustrated in FIG. 2) places (or receives) a telephone call, the annotation component 116 retrieves any annotations associated with the number being called. The annotation recordings may be stored in storage 210, or may be stored by an annotation server 130 at the mobile telephone services provider. Alternatively, the annotation recordings may be stored in both locations. For example, the annotation component 116 may use storage 210 to store annotations corresponding to the most recently dialed telephone numbers, or most recently created annotation recordings.

Figure 3:
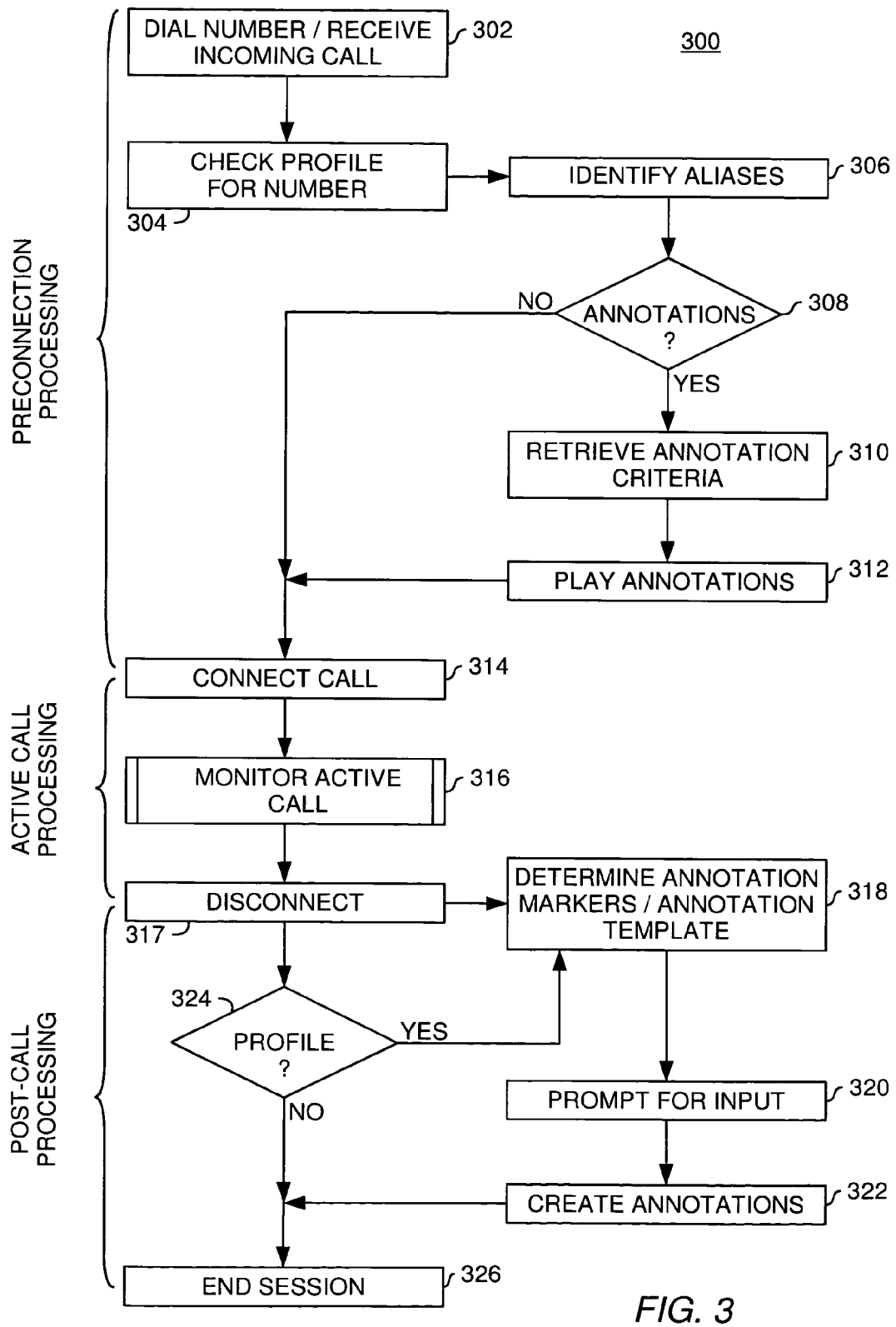
FIG. 3 illustrates a method for creating, using, and managing audio-based annotations, according to one embodiment of the invention, according to one embodiment of the present invention.

FIG. 3 illustrates exemplary operations 300 for creating and managing audio-based annotation recordings for telephone conversations, according to one embodiment of the invention. As illustrated, the operations 300 are divided into three sections: pre-connection processing, active call processing, and post connection processing.

Operations 300 begin at step 302 when an individual initiates (or alternatively receives) a telephone call. At step 304 the telephony annotation component (e.g., annotation server 116) determines whether there is a profile for a telephone number under consideration. That is, the telephone number dialed (when placing a telephone call) or the telephone number identified using ANI data (when receiving a telephone call) is determined. In one embodiment, a relational database table may be used to tie annotation recordings to a particular number. This way, annotation recordings may be joined to multiple numbers for the same individual using a table of telephone aliases.

At step 306, the annotation component determines whether there are any aliases associated with the telephone number under consideration. For example, an individual may have more than one telephone number associated with them, and annotation recordings linked to different telephone numbers may, in fact, be related to the same individual. For example, many individuals have distinct home, office, and mobile telephone numbers. Accordingly, each telephone number related to a particular individual may be an alias to the other telephone numbers and used to identify annotations related to a particular individual based on multiple telephone numbers.

Once the telephone number and any aliases have been identified, at step 308, the annotation component 116 determines whether there are, in fact, any annotations for the number (or aliases) under consideration. If not, the call is connected and the method continues to step 314. Otherwise, when there are existing annotations for the telephone number under consideration, a set of annotation playback criteria may be used to determine whether any of the existing annotations should be played prior to connecting the call. For example, an annotation profile may specify that only annotations for certain numbers, or only those annotations that are younger than a specified age, or where the annotations recordings contain certain substantive content should be played prior to connecting a call.

At step 312, any annotation recordings that satisfy the playback criteria are played for the individual using the annotation services provided by the present invention. In one embodiment, the annotation recording may comprise a recorded portion of a prior conversation and the recorded annotation. In another embodiment, only the annotation recording is played back to the individual. In one embodiment, the annotation recording may be modified to speed up the playback to shorten the time taken to play the annotation recording. Additionally, pressing different key combinations on the telephone (e.g., keypad 214) may navigate through annotation recordings (e.g., skip forward and back, replay, pause or quit). After any annotations recordings have been played back, the call is connected at step 314.

At step 316, the active telephone call is monitored for any breakout codes. As used herein, a breakout code refers to a message sent to the annotation component 116 (or telephony annotation server) used to signal it to perform a function indicated by the message. For example the breakout code may indicate a marker point of the ongoing conversation that a user has selected for later annotation. Once such a breakout code is entered, the annotation component 116 may record a portion of the conversation that is taking place. In one embodiment, the annotation component may continuously record a rolling portion of the conversation. For example, the annotation component 116 may maintain a recording of the previous sixty seconds of the conversation. This allows the annotation marker to reference portions of the conversation both before and after the marker. This is useful because it may not be apparent in advance that a portion of a conversation should be annotated. That is, sometimes a participant in a conversation will want to create an annotation for what was just said—not what is about to be said.

At step 317, after the conversation has ended, the call is disconnected. At this point, post-call processing begins. Post-call processing begins at step 318, where the annotation component 116 determines whether there are any annotation templates that should be used to create annotations for the just ended conversation. Annotation templates are described in greater detail below in connection with FIG. 5.

For each annotation template selected in step 318, an individual may be prompted for annotation input at step 320. For example, after prompting a user to provide input, an individual may create and annotation recording simply by summarizing the just ended telephone conversation in her own words. Accordingly, at step 322, the annotation recordings are created. Next at step 324, this process repeats to determine if any additional annotation templates should be used to generate an annotation recording for the just ended telephone call. Once completed, annotation processing for the particular phone call ends at step 326.

Figure 4:
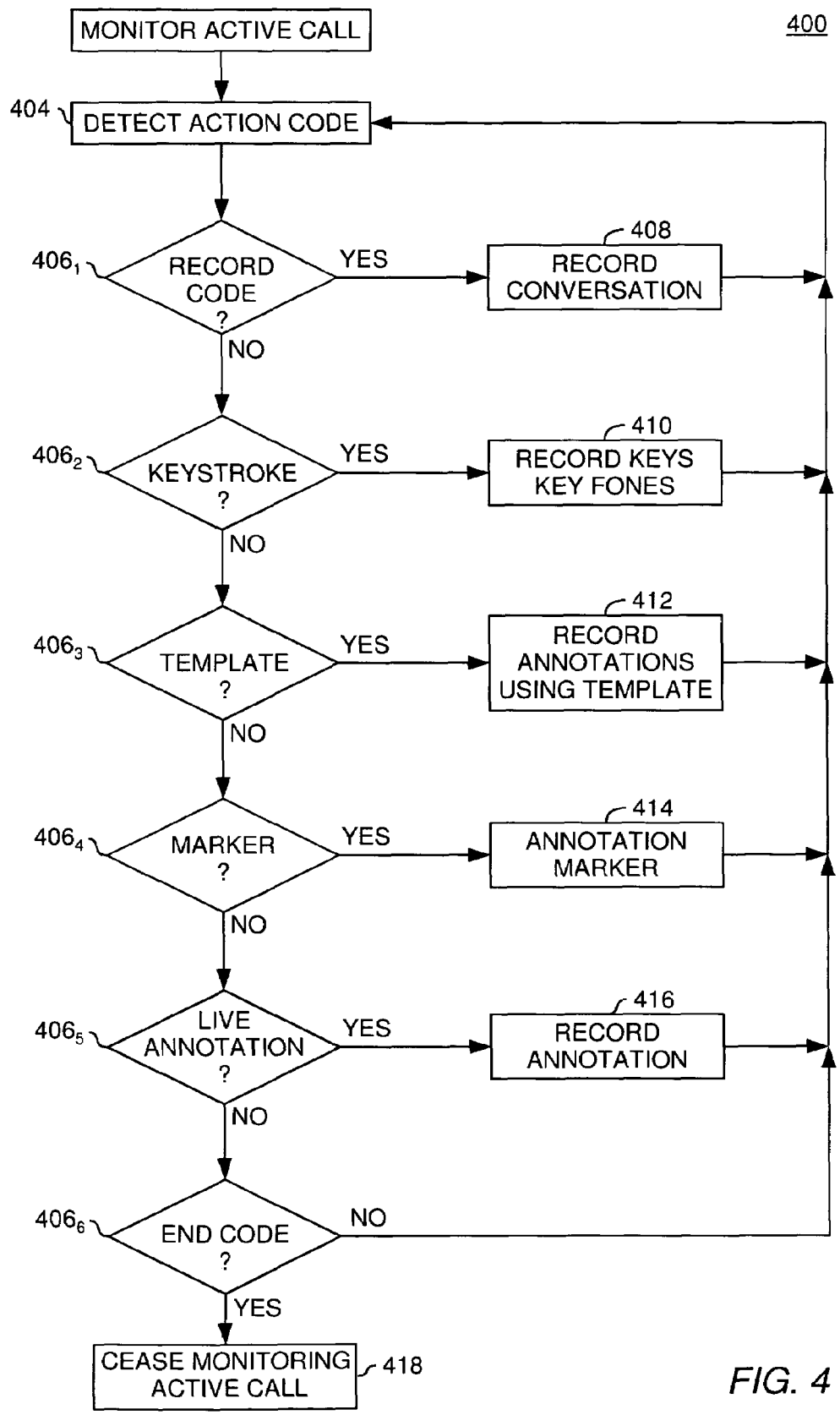
FIG. 4 illustrates a method for annotating an active telephone conversation, according to one embodiment of the present invention.

FIG. 4 illustrates a method for monitoring an active call for breakout codes, (e.g., step 316 from FIG. 3) according to one embodiment of the invention. The operations 400 begin where pre-call processing is complete (e.g., step 316 from FIG. 3). At step 404, the annotation component 116 monitoring the active call detects a breakout code generated by the individual using the annotation component. In one embodiment, of the present invention a breakout code may be generated by pressing a set of keys using keypad 214 on mobile phone 122. In another embodiment, a breakout code may be entered via a terminal operated by a CSR 120 fielding telephone calls at a call center 106 (from FIG. 1). The CSR 120 may be engaging in a conversation with a caller while using a telephone and a general purpose computer connected to a network. The computer may be configured to generate breakout codes processed by the telephony annotation server 116, record the conversation, and to place annotation marker points.

At step 406, the annotation component 116 determines the action associated with the breakout code detected in the previous step. For example, break out code actions $406_{1-5}$ illustrate a number of possible breakout code actions. Different embodiments may implement all, some, or a completely different set of breakout codes from those illustrated in FIG. 4. Action code $406_1$, illustrates a "record" action code. After receiving a record action code the annotation component 116 may cause the currently active conversation to be recorded or may signal the annotation component to save an ongoing recording of the conversation, or portion thereof, after the conversation is completed.

If the action code is a "keystroke" code, ($406_2$) then at step 410 the annotation component may record a series of keystrokes (or DTMF) as an annotation. For example, during a conversation, one party might provide a phone number and address or other data to an individual using the annotation services that may wish to record this information as an annotation. Another example includes predefined annotation values for an annotation template. A sales call template might define a keystroke corresponding to the likelihood of an eventual sale. This annotation might later be previewed by another person calling the same telephone number at a later date to follow up to the original conversation.

At step $406_3$, if the action code is a "template" action code, the annotation component 116 may actively record an annotation recording made by the individual using the annotation service on top of the conversation that is occurring, at step 412. In one embodiment, this may occur by temporarily redirecting the output from the telephone microphone to create an annotation recording using the annotation template specified by the action code. Alternatively, the annotation component 116 may simply mark the point in the conversation for later annotation using the annotation template specified by the "template" action code. If the action code is a "marker" action code (step $404_3$), then at step 414, the annotation component 116 begins recording the active conversation (if it is not already being recorded) and marks the point in the conversation for later annotation.

Step $406_5$ illustrates a "live recording" action code similar to the "template" action code that redirects the output from the telephone microphone to create an annotation recording not using a specified template; instead, an individual may create a free-form annotation recording (step 416). In one embodiment, an individual using the annotation component 116 may specify a particular button to create an annotation recording during an ongoing conversation. So long as the particular button remains pressed, the annotation recording may continue. This way, the user may alternate between creating annotations for an active conversation and participating in the active conversation. Finally, breakout code $406_6$ illustrates an action code signaling the annotation component 116 and to stop monitoring an ongoing conversation for breakout codes, or to stop recording an ongoing conversation (step 418).

Figure 5:
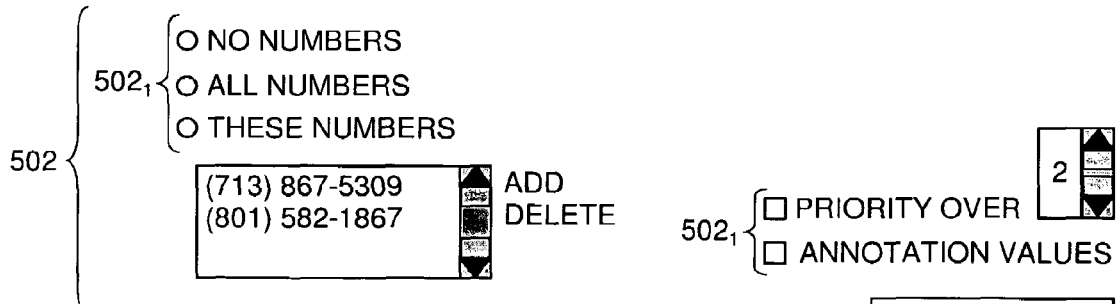
FIG. 5, illustrates a graphical user interface screen that displays an annotation preferences profile, according to one embodiment of the invention.
Figure 5:
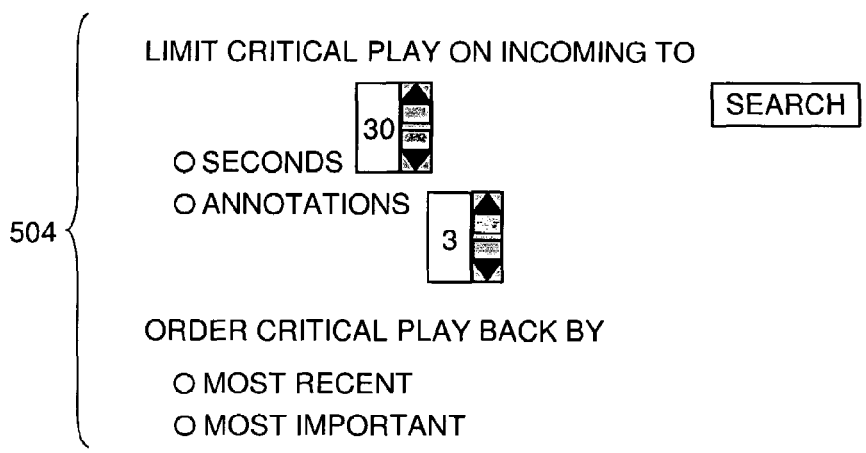
Figure 5:
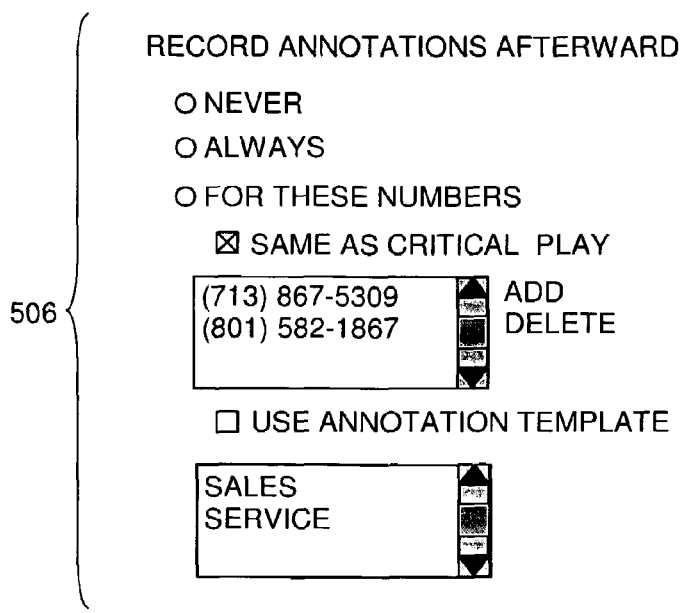

As described above, annotation recordings created from a prior conversation may be played back to an individual according to an annotation profile associated with the individual using the annotation component 116. FIG. 5 illustrates an exemplary graphical user interface screen that may be used to define or modify and annotation profile for a particular user. As illustrated, the profile 500 includes critical playback criteria used to determine whether annotations recordings are replayed for an individual prior to connecting a call (e.g., step 304 from FIG. 3). Radio buttons $502_1$, illustrate multiple preferences for defining what annotations to playback prior to connecting a call. For example, an individual may select no numbers, all numbers, a specific group of numbers, or specific categories to specify the annotation recordings that should be played to the individual prior to connecting a call. Selection criteria 504 illustrates choices that an individual may select to constrain the manner in which annotation recordings are played back such as a maximum time and ordering priority.

In one embodiment, the graphical user interface screen may be displayed on the display panel of mobile telephone device 200. Because such screens may be small in size, a user may scroll through such information. Additionally, if multiple annotations are available, a user may select which ones to display (or review). Alternatively, the profile may be displayed using a computer connected to a network configured to transmit profile data to annotation services provider. For example, a user may interact with an internet webpage associated with the service provider to specify profile settings.

Post-call criteria 506 illustrate profile selections that define which annotation recordings are created after completing a conversation. In one embodiment, the post call criteria are default values that may be modified or overridden using breakout call codes entered by a user during call monitoring, according to the method illustrated in FIG. 4. The post call criteria 506 may include selections to always, or never, create annotation recordings. More fine-grained criteria allow for annotations for telephone numbers specified by the profile 500. In one embodiment, the telephone numbers for which annotations are recorded are identical to those for which annotations are played before connecting a call placed to (or received from) the telephone number. In addition, post-call criteria 506 may also specify which annotation templates to use to create an annotation recording during post call processing. Alternatively, annotation recordings created during post call processing may record free-form audio to create an annotation recording without using an annotation template.

Figure 6:
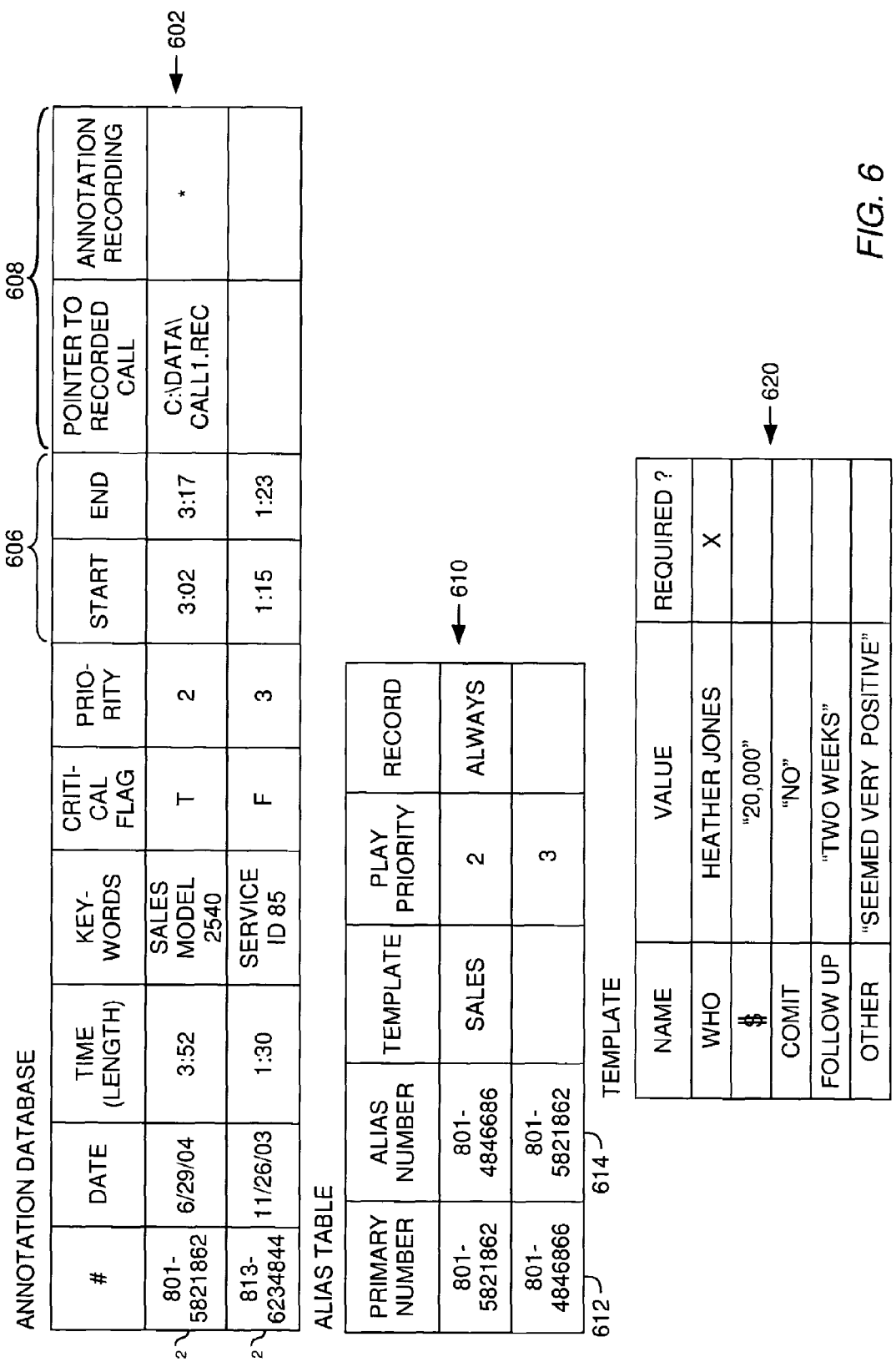
FIG. 6 illustrates database tables and data structures used to manage audio-based annotations, according to one embodiment of the present invention.

FIG. 6 illustrates database records and data structures that may be used to create, manage, and store annotation recordings for a telephone conversation. In one embodiment, annotation component 116 may maintain a database of annotation recordings 602 created for telephone conversations. A new row of the database table 602 is created for each new annotation recording. The database 602 may also include a set of keywords associated with the annotation that may be determined using speech-to-text analysis of the recorded conversation or the annotation recording, or may be entered by an individual creating the annotation. In addition, time frames 606 may be used to specify the portion of the conversation corresponding to the annotation record. Additionally, each database record (i.e., a row from table 602) may provide information about where the actual recorded conversation and annotation recording are stored within the system. For example, annotation recordings may be stored by mobile phone memory 206 (from FIG. 2) or by the annotation server 116 (from FIG. 1).

Alias table 610 illustrates an embodiment of a database record used to manage telephone aliases described above. A particular individual may have more than the telephone number associated with them. Accordingly, the annotation component may need to link an individual to more than one phone number. Each row of the alias table 610 may include primary number 612 and aliased number 614. Additionally, each alias record may include additional information about the phone number, including annotations, a playback priority assigned to an annotation (or to the phone number), a template used to create an annotation, and other meta data about both the individual corresponding to the phone number and annotations for the telephone number.

Annotation template 620 illustrates a template that may be used to generate an annotation recording, according to one embodiment of the invention. As illustrated, the template 620 includes a list of annotation fields 622 and corresponding recording values 624. Although illustrated using text values, the annotation values 624 may comprise the voice recording from the individual that created the annotation. In addition, an annotation template 620 may specify attributes regarding the annotation fields. For example, as illustrated, template 620 includes a required value indicating that certain fields must have a value to create a valid annotation recording from the annotation template 620.

In one embodiment, annotation templates may be constructed using VoiceXML. VoiceXML is an emerging XML-based standard for creating audio-based dialogs featuring synthesized speech, digital audio, recognition of spoken and key word input, and recording of spoken input. By way of illustration, table 1 describes the annotation template 620 in Voice XML.

TABLE I

VOICEXML ANNOTATION TEMPLATE

```
01  <?xml version="1.0" encoding="UTF-8"?>
02  <vxml xmlns="http://www.w3.org/2001/vxml"
03    xmlns:xsi=http://www.w3.org/2001/XMLSchema-instance
04    xsi:schemaLocation="http://www.w3.org/2001/vxml
05    http://www.w3.org/TR/voicexml20/vxml.xsd" version="2.0">
06    <form>
07      <field name="who">
08        <prompt>What was the name of the caller?</prompt>
09        <grammar src="names.grxml" type="application/srgs+xml"/>
10      </field>
11      <field name="amount">
12        <prompt>Was a price quoted, and if so how much?</prompt>
13        <grammar src="prices.grxml" type="application/srgs+xml"/>
14      </field>
15   ....
16      <field name="follow_up">
17        <prompt>On what date should a follow up call be
          made?</prompt>
18        <grammar src="dates.grxml" type="application/srgs+xml"/>
19      </field>
20      <block>
21    <submit next="http://www.drink.example.com/drink2.asp"/>
22      </block>
23    </form>
24  </vxml>
```

When the annotation template 620 is used to create an annotation recording for a telephone call, using the methods described above, it creates a dialog between the individual creating the annotation recording and an annotation component 116. The dialog proceeds sequentially, as defined by the VoiceXML document listed in Table I:

C: (Annotation Component) What was the name of the caller?

H: (Individual using the annotation component) "Heather Jones"

C: "Was a price quoted? If so, please state the amount"

H: "Price quoted is 20,000 dollars"

C: "On what date should a follow up call be made?"

H: "gribneff" (unrecognized)
C: "I didn't understand you, please restate"
H: "2 weeks"

This dialog proceeds until an acceptable value has been obtained for each required values provided by the annotation template 620.

Illustrative Applications of Audio-Based Annotations

Using the techniques described herein, a number of illustrative examples of audio-based annotations applied to a telephone conversation may be described.

Consider a business call to a sales person. A possible client informs the sales person that she has a child named Vicky, who is having a birthday party on the following week. As the call progresses (or immediately thereafter) the sales person presses a key combination to generate a live recording breakout code and records, "has a child named Vicky—send birthday gift next week". When subsequently calling the potential client, the sales person has their annotation profile configured to play annotations from the last three calls to the customer before the call is engaged. The sales person calls the customer, but before the call goes through, the annotations from the last three calls are played and the sales person hears that the child's name is Vicky, and uses this tidbit to bring along a conversation.

Annotations may be made by others to the same number, and within the same database may be shared. Thus when the sales person hears the annotations prior to the call, she also hears an annotation made by her boss, "customer just got divorced—very sore topic" and she knows to avoid the issue with the customer. This works the other way around. The customer calls the sales person, the system puts the customer in a long ring cycle and annotations are played for the sales person before being connected to the customer. The annotation created for the particular number may be created after a prior call between the boss and customer, but may also be created at any time. For example, the annotation service may provide a mechanism to create annotations for a particular number by entering the telephone number in a telephones device, without also placing a telephone call to the number.

Annotation made by different individuals also may assist CSRs fielding calls in a call center like the one described in reference to FIG. 1A. As a first CSR has a conversation with a customer, he may create audio based annotations regarding the information provided to the customer. Alternatively, or in addition, annotations may be created after a conversation is completed using free form annotation recordings or templates. A subsequent CSR may listen to these annotations and have a clear understanding of the customer's expectations when she calls a second time. Thus, the subsequent CSR may be able to provide service more specific to the customer's needs during subsequent calls. In one embodiment, the annotations are played back to the subsequent CSR prior to CSR's fielding a telephone call from the customer.

In another embodiment, an individual may subscribe to an annotation service provided by a mobile (or VoIP) services provider. The telephone device used may itself include an annotation management system (e.g., annotation component 116). An individual using an annotation enabled telephone device might create annotations to phone calls to create a personal reminder system and information store. For example, a tenant is attempting to call her landlord, but the landlord is being evasive. Before the call, the tenant presses a key combination and states: "Calling the Landlord for the sixth time, these are business hours, he should pick up, but I'll be surprised if he does." The annotation recording, along with an index to the telephone number and the date/time, are stored by the telephone device (or alternatively by a telephony annotation server in communication with the telephone device) providing a record of the call. The documentation created by annotation recordings may be later be useful to prove otherwise difficult to prove events (e.g., when the tenant called a landlord).

If the landlord does answer, a conversation may ensue about lease agreements and the parties may agree to an early termination of the lease. Hypothetically, assume he landlord agrees that if the current month's payment is on time, and another renter is found before the $20^{th}$ of the month, he will agree to allow the tenant to terminate the lease the lease without penalty. The caller presses keystrokes activating a breakout code to record the previous 15 seconds of the conversation. Another key allows the user to make a comment into the microphone without the landlord hearing; this comment may be time stamped. This may be a personal comment from the caller to herself that she must be sure to pay the rent on time so the deal will work. This comment is marked for recall prior to the rent payment due date. At the end of the conversation, the caller presses keystrokes and makes another annotation, summarizing the call: "the landlord promised that if I get the rent in on time and another renter is found by the $20^{th}$ I can get out of the lease."

While the foregoing is directed to embodiments of the present invention, other and further embodiments of the invention may be devised without departing from the basic scope thereof, and the scope thereof is determined by the claims that follow.

What is claimed is:

1. A method for annotating a telephone conversation, comprising:

in response to a request to connect a telephone call to a telephone number, presenting a portion of a previously recorded telephone conversation with the participant and a previously recorded annotation associated with the previously recorded telephone conversation when a set of playback criteria is met;

connecting the telephone call to the telephone number to establish a connection;

during a telephone conversation on the connection, creating at least one annotation marker corresponding to a temporal point in a recording of the telephone conversation; and recording an annotation corresponding to the annotation marker, wherein the annotation includes voice data, wherein the annotation is recorded after the telephone conversation is concluded and the recorded annotation is structured in a form defined by an annotation template, wherein the annotation template defines a sequential dialog that specifies a series of audio prompts to present to an individual creating the annotation.

2. The method of claim 1, further comprising selecting a telephone number to associate with an annotation recording, wherein the selecting comprises one of: retrieving ANI data from an incoming telephone call, capturing a telephone number dialed for an outbound telephone call, and retrieving a telephone number obtained from an IVR system processing an incoming telephone call.

3. The method of claim 1, wherein recording an annotation occurs contemporaneously with the creating at least one annotation marker during the telephone conversation.

4. The method of claim 1, further comprising:

monitoring the now active telephone conversation to detect any annotation breakout codes that signal an annotation component to carry out an annotation function;

processing each breakout code;

identifying any annotations markers and annotation templates used to create annotation recordings for the telephone conversation; and creating annotation recordings for each identified marker and annotation template, wherein the annotation recording comprises a recorded statement associated with at least a portion of the conversation.

5. The method of claim 4, wherein the annotation function signaled by a breakout code may comprise at least one of: a signal to record the active conversation, a signal to place an annotation marker to mark a point in the conversation for later annotation, or to signal the creation of an annotation recording contemporaneous with the active conversation.

6. The method of claim 4, wherein a breakout code is signaled by pressing a predefined combination of buttons present on a telephone device.

7. A method for annotating a telephone conversation, comprising:

in response to a request to connect a telephone call to a telephone number, presenting a portion of a previously recorded telephone conversation with the participant and a previously recorded annotation associated with the previously recorded telephone conversation when a set of playback criteria is met;

connecting the telephone call to the telephone number to establish a connection;

during a telephone conversation on the connection, creating at least one annotation marker corresponding to a temporal point in a recording of the telephone conversation;

choosing one of a plurality of annotation templates which each define a structured form of an annotation, wherein the annotation template defines a sequential dialog that specifies a series of audio prompts to present to an individual creating the annotation; and recording an annotation corresponding to the annotation marker, wherein the annotation includes voice data, recorded from a user guided by the audio prompts of the chosen annotation template.

8. A method for annotating a telephone conversation, comprising:

in response to a request to connect a telephone call to a telephone number, presenting a portion of a previously recorded telephone conversation with the participant and a previously recorded annotation associated with the previously recorded telephone conversation when a set of playback criteria is met;

connecting the telephone call to a telephone number to establish a connection;

during a telephone conversation on the connection, creating at least one annotation marker corresponding to a temporal point in the telephone conversation;

during the telephone conversation on the connection, maintaining a rolling portion of the telephone conversation, the rolling portion being a preceding predetermined period of time of the telephone conversation; and recording an annotation corresponding to the annotation marker, wherein the annotation includes voice data, wherein the annotation is recorded after the telephone conversation is concluded and the recorded annotation is structured in a form defined by an annotation template, wherein the annotation template defines a sequential dialog that specifies a series of audio prompts to present to an individual creating the annotation.

9. The method of claim 7, further comprising:

during the telephone conversation, maintaining a rolling portion of the telephone conversation, the rolling portion being a preceding predetermined period of time of the telephone conversation.

* * * * *